Jan. 23, 1968

JAMES E. WEBB
ADMINISTRATOR OF THE NATIONAL AERONAUTICS
AND SPACE ADMINISTRATION
POWER SUPPLY 3,365,657

Filed March 4, 1966

Manuel Kramer
Louis H. Martinage
INVENTORS

BY
ATTORNEYS

Jan. 23, 1968 JAMES E. WEBB 3,365,657
ADMINISTRATOR OF THE NATIONAL AERONAUTICS
AND SPACE ADMINISTRATION
POWER SUPPLY
Filed March 4, 1966 2 Sheets-Sheet 2
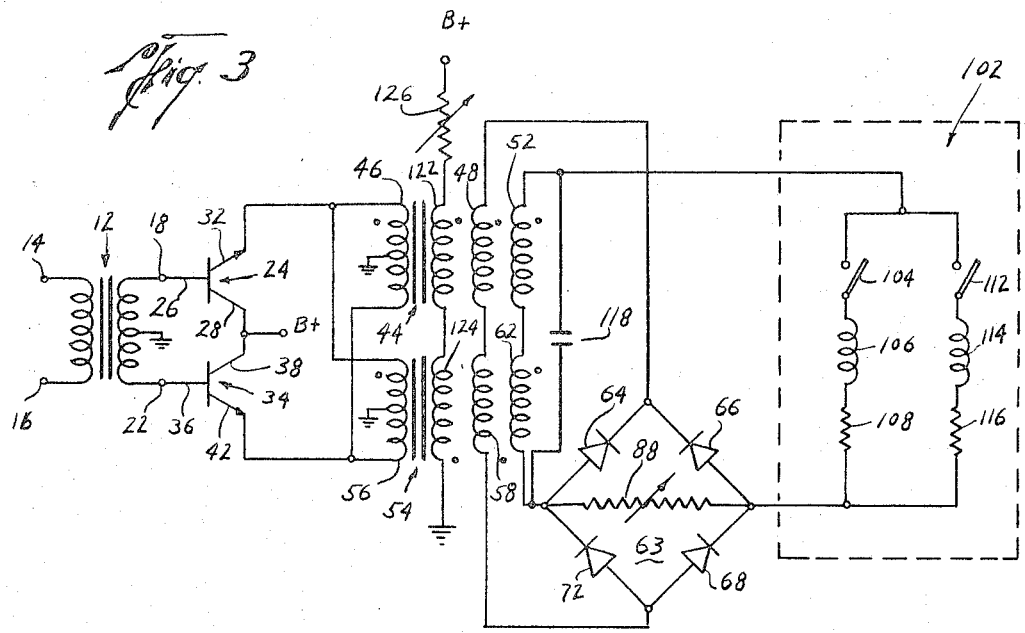
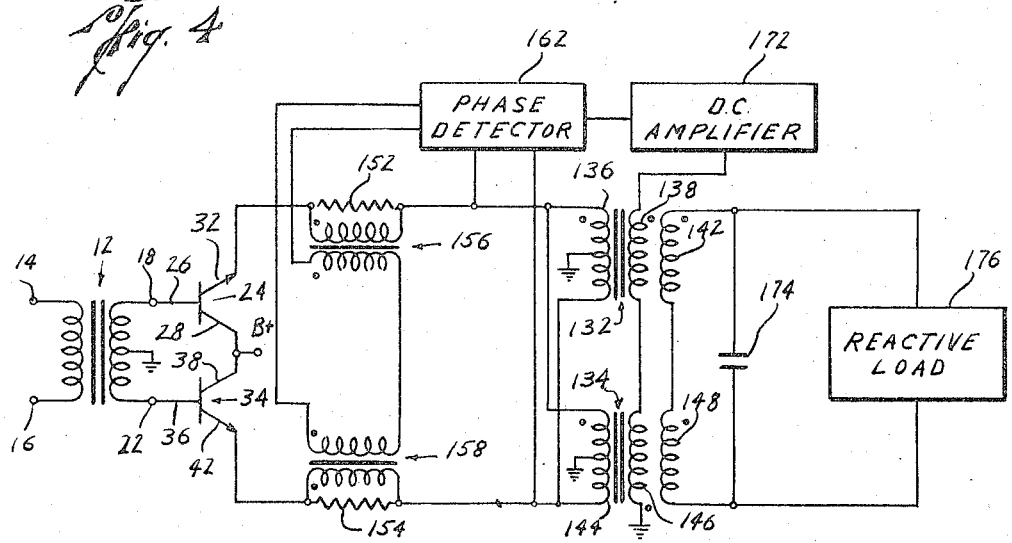
Manuel Kramer
Louis H. Martinage
INVENTORS
BY
ATTORNEYS ns of Patent Office
3,365,657
Patented Jan. 23, 1968

1

3,365,657
POWER SUPPLY
James E. Webb, administrator of the National Aeronautics and Space Administration, with respect to an invention of Manuel Kramer, Laurel Drive, Lincoln, and Louis H. Martinage, 41 Harvard St., Reading, Mass.
Filed Mar. 4, 1966, Ser. No. 534,564
10 Claims. (Cl. 323—56)

The invention described herein was made in the performance of work under a NASA contract and is subject to the provisions of section 305 of the National Aeronautics and Space Act of 1958, Public Law 85–568 (72 Stat. 435; 42 U.S.C. 2457).

This invention relates in general to electronic power supplies and, more particularly, to an automatic power factor correction system.

When supplying power to a load having a very low power factor, large leading or lagging current results when the desired output power lever is attained. If the efficiency of the power supply is to be optimum, it becomes necessary to adjust the power factor, as seen by the power amplifying elements, to as close to unity as possible. Previous load compensating techniques require the insertion of an inductor into the load circuit if the load was highly capacitive, and, vice versa, a capacitor into the load circuit when the load was highly inductive. With the reactance inserted equal to the negative reactance of the load, a minimum of current is needed in order to produce the desired output power for the load. Should the capacitance or inductance of the load vary, it becomes necessary to once again change the inductance or capacitance, respectively.

In order to overcome the attendant disadvantages of prior art power factor correction systems for use in power supplies where the highly reactive load is variable, the power supply in the present invention automatically corrects the power factor of a reactive load, as seen by the power amplifying elements of a power amplifier. As a result thereof, the power amplifier system of the present invention provides optimum power conversion efficiency, improved regulation, which results in increased reliability in the power amplifying elements.

More particularly, the circuit comprises an input transformer having a source of A.C. voltage applied to the input terminals thereof. The output terminals are connected to a pair of transistors connected for push-pull Class B operation. The output of the transistors are connected to the input side of a pair of output transformers, the output side of the output transformers being connected across a load having a variable reactance. The output transformers further comprise control windings having a direct current applied thereto which is a function of the load circuit and which varies the self-inductance of the output transformers in such a manner as to provide a unity power factor as viewed from the transistors.

The advantage of this invention, both as to its construction and mode of operation, will be readily appreciated as the same become better understood by references to the following detailed description when considered in connection with the accompanying drawings in which like reference numerals designate like parts throughout the figures, and wherein:

FIG. 3 is a circuit diagram of the novel power supply in accordance with this invention wherein the load is normally inductive; and

2

FIG. 4 is a circuit diagram of the novel power supply utilizing a feedback control circuit to correct for either an inductive or capacitive reactive load.

Figure 1:
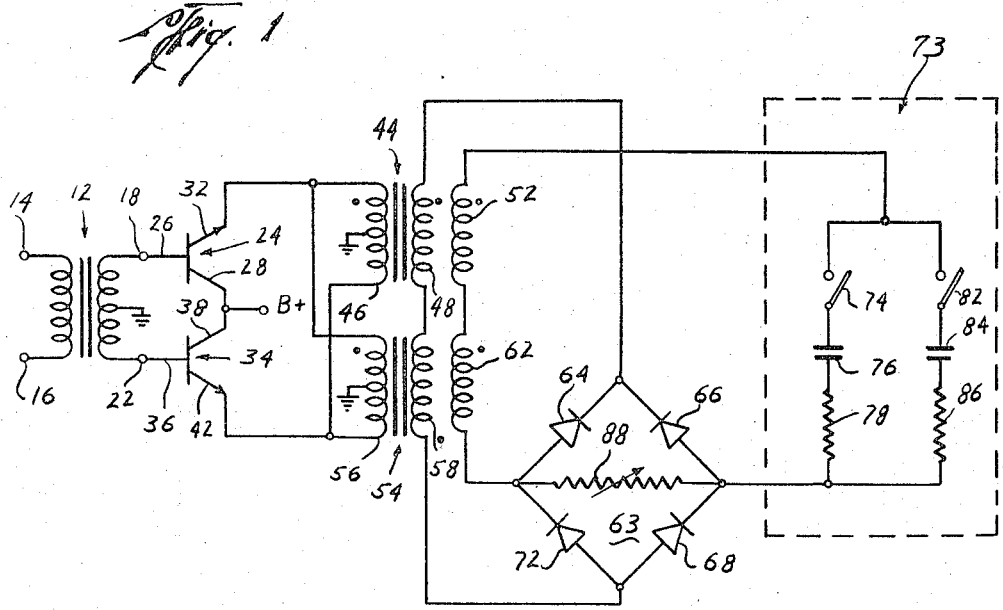
FIG. 1 is a circuit diagram of the novel power supply in accordance with this invention wherein the load is normally capacitive.

Referring now to FIG. 1, there is shown a power supply circuit for correcting the power factor of a capacitive load. The circuit contains an input transformer 12 having a pair of input terminals 14, 16 connected across the input winding of the transformer 12. A pair of output terminals 18, 22 are connected across the output winding of transformer 12, the output winding center tap being connected to ground. The output terminal 18 is connected to a transistor 24 at its base 26. The transistor 24 further comprises a collector 28 and emitter 32. The output terminal 22 is connected to a transistor 34 at its base 36. The transistor 34 further comprises a collector 38 and an emitter 42. The collector 28 and the collector 38 are joined together and connected to a positive source of power supply (B+).

The circuit further comprises a first output transformer 44 having an input winding 46 whose center tap is connected to ground, a control winding 48, and an output winding 52. A second output transformer 54 has an input winding 56 having a center tap connected to ground, a control winding 58, and an output winding 62. The emitter 32 of transistor 24 is connected to one side of the input winding 46 and to one side of the input winding 56. The emitter 42 is connected to the other side of input winding 46 and the other side of input winding 56.

Direct current for the control windings 48 and 58 are produced by a diode rectifier bridge 63 formed of a first diode 64, a second diode 66, a third diode 68, and a fourth diode 72. The cathodes of diodes 64 and 66 are joined together and connected to one side of the control winding 48. The other side of the control winding 48 is connected to one side of the control winding 58, the other side of the control winding 58 being connected to the junction of the anodes of diodes 68 and 72.

The load 73 for the circuit is schematically illustrated as comprising a pair of parallel paths. The first path comprises a switch 74, a capacitor 76, and a resistor 78, all connected in series. The second parallel path comprises a switch 82, a capacitor 84, and a resistor 86, all connected in series. One side of the load 73 is connected to one side of the output winding 52, the other side of the output winding 52 being connected to one side of the output winding 62. The other side of the output winding 62 is connected to the junction of the anode of diode 64 and the cathode of diode 72. The other side of the load 73 is connected to both the junction of the anode of diode 66 and the cathode of diode 68. Further, a trimming resistor 88 is connected on one side to the junction of the anode of diode 64 and the cathode of diode 72, and on the other side to the junction of the anode of diode 66 and the cathode of diode 68.

The transistors 24, 34 provide a push-pull input to the parallel connected input windings 46, 56, and the output windings 52, 62 provide a series connected single-ended output. With the switches 74 and 82 open, the unloaded transformer will draw a small lagging reactive current in the input windings of transformers 44, 54 and a voltage will appear across the windings 52, 62, which is a function of the turns ratio from the input side to the output side of the transformers 44, 54. No voltage will appear across the windings 48, 58. If a D.C. current is supplied to the windings 48, 58, the transformer will become slightly saturated, the incremental permeability will decrease, thereby decreasing the self-inductance, and the lagging current drawn by the transformer will increase.

When the switch 74 or the switch 82 is closed, the diode bridge 63 rectifies the current drawn by the load 73. The rectified load current flows through the control windings 48, 58 and causes the lagging current drawn by the transformer to increase. By properly adjusting the trimming resistor 88, the increase in the lagging current can be made to track the leading current caused by the capacitive load 73 with a net result of a power factor close to 1.0 as viewed from the transistors 24, 34. If both switches 74 and 82 are closed and the leading current through the load increases, the current through the control windings 48, 58 will once again increase, increasing the lagging current drawn by the transformer which compensates for the increased leading current through the load. Thus, with a leading load current, the control current can be adjusted such that the total current (vector sum) in the windings 46, 56 is in phase with the voltage across it, which, in effect, presents a unity power factor to the transistors 24, 34.

Figure 2:
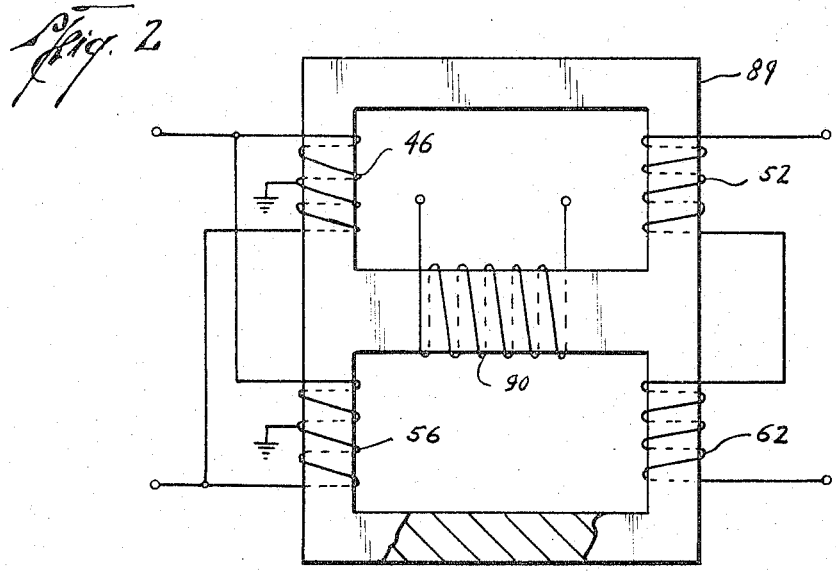
FIG. 2 is an alternative embodiment of the output transformer utilized in the device of FIG. 1.

Referring now to FIG. 2, there is shown an alternative transformer configuration, which is functionally identical to the output transformer 44, 54 of FIG. 1 and is used to achieve the same results. The embodiment of FIG. 2 differs only in that one core 89 of magnetic material is used instead of two separate cores. The input windings 46, 56 are connected in parallel, and the output windings 52, 62 are connected in series. The control windings 48, 58 of FIG. 2 are replaced by a single control winding 90. The magnetic flux, produced by the primary windings, follows the outside legs of the core. No net flux flows into the center leg of the core where the control winding 90 is placed due to the flux cancellation in the center core, which prevents any induced voltage in the control winding 90.

When D.C. current flows into the control winding 90, the flux generated follows the center leg and travels around the outside legs. The D.C. flux in the outside core legs controls the incremental core permeability and, therefore, the self-inductance.

Referring now to FIG. 3, there is shown an alternative embodiment of the device of FIG. 1 wherein a load 102 of FIG. 3 is inductive and thus produces a lagging current. The load 102 is schematically illustrated as a pair of parallel paths. The first path comprises a switch 104, an inductor 106, and a resistor 108 connected in series, and the second parallel path comprises a switch 112, an inductor 114, and a resistor 116 connected in series. A capacitor 118 is connected across the output windings 52, 62. Further, a second control winding 122 is added to the first output transformer 44, and a second control winding 124 is added to the second output transformer 54. One side of the control winding 124 is connected to ground, and the other side of the control winding 124 is connected to one side of the control winding 122. The other side of the control winding 122 is connected through a variable resistor 126 to a positive source of power supply.

In the embodiment of FIG. 3, in addition to a control current produced by the diode bridge 63 through the control windings 48, 58, a bias current is produced by the windings 122, 124. Adjustment of the resistor 126 produces a fixed bias current through the windings 122, 124, which saturates the transformer and results in a low self-inductance. The capacitor 118 across the windings 52, 62 is chosen so that with zero control current, the lagging current, due to the transformers, is compensated for by a leading current due to the capacitor 118. Upon closure of the switches 104 and 112, the control current produced by the rectifier bridge 63 produces a flux, which subtracts from the bias flux through the windings 122, 124 resulting in an increased self-inductance. As the lagging current due to the load is increased, the lagging current due to the transformer is decreased because of the increased self-inductance of the transformer. Thus, a near unity power factor load as seen by the transistors 24, 34 is obtained.

Referring now to FIG. 4, there is shown an alternative embodiment of the invention wherein a feedback control circuit can correct for a non-unity power factor due to a variable reactive load. A feedback signal, which is proportional to the phase difference between the voltage and current at the input side of a pair of output transformers 132, 134, is fed back through the control winding of each of the transformers 132, 134. The transformer 132 comprises an input winding 136, a control winding 138, and an output winding 142. The transformer 134 comprises an input winding 144, a control winding 146, and an output winding 148. Connected between the emitter 32 and one side of the input winding 136 and one side of the input winding 144 is a resistor 152. Connected between the emitter 42 and the other side of input winding 136 and the other side of the input winding 144 is a resistor 154.

A transformer 156 has its primary winding connected across the resistor 152, and a transformer 158 has its primary winding connected across the resistor 154. The secondary winding of the transformer 156 and the secondary winding of the transformer 158 are connected together on one side thereof, the other side thereof each being an input to a pair of terminals of a phase detector 162.

Also connected to the phase detector 162 at two other input terminals are a pair of leads connected across the parallel connected input windings 136, 144. The output of the phase detector is fed into the input of a D.C. amplifier 172. The output of the D.C. amplifier 172 is coupled to one side of the control winding 138, the other side of the control winding 138 being connected to one side of the control winding 146, and the other side of the control winding 146 being connected to ground. A capacitor 174 is connected in parallel across the series connected output windings 142, 148. A load 176 is also connected in parallel across the output windings 142, 148.

In the embodiment of FIG. 4, the current supplied by the transistors 24, 34, which, in effect, is the current through the resistor 152 and the resistor 154, is sampled by the transformer 156 and the transformer 158, respectively, and fed as one input to the phase detector 162. The other input to the phase detector is the voltage across the parallel connected input windings 136, 144. Since the transformer 132 and the transformer 134 are driven push-pull, the current must be sampled on both sides. The phase detector generates an error signal proportional to the angular difference between the voltage and current sampled.

The error signal is amplified by the D.C. amplifier 172, and a control current developed in the control windings 138, 146. The control current will adjust the self-inductance so as to drive the phase angle between the voltage and current being sampled to zero. Since the control winding only reduces the self-inductance of the transformers, capacitor 174, which is connected across the series connected windings 142, 148, is chosen so that the leading current, due to the capacitor alone, will be greater than the maximum lagging current that can be expected due to an inductive reactive load.

It should be further understood that the foregoing disclosure relates only to preferred embodiments of the invention, and that it is intended to cover all changes and modifications of the examples of the invention herein chosen for the purpose of the disclosure which do not constitute departures from the spirit and scope of the invention.

What is claimed and desired to be secured by Letters Patent is:

1. An automatic power factor correction circuit for providing a unity power factor to a power supply source in a system having a reactive load comprising:
   a transformer having an input winding, a control winding, and an output winding, means coupling said power supply source to said input winding;
   means coupling said output winding to said reactive load; and
   means for producing a current in said input winding in phase with the voltage across said input winding comprising a first means coupled to said control winding for providing a control current to said control winding, said control current varying in magnitude with the amplitude of the current in said reactive load.

2. An automatic power factor correction circuit in accordance with claim 1 wherein said first means comprises a rectifier bridge coupled between one side of said reactive load and one side of said output winding.

3. An automatic power factor correction circuit in accordance with claim 2 wherein said reactive load is inductive and produces a lagging current, said system further comprising:
 a capacitor connected across said output winding;
 means for saturating said transformer and thereby providing a low self-inductance therein comprising a second transformer control winding having a second means for supplying a control current coupled thereto; and
 wherein said control current from said first means increases the self-inductance of said transformers when said lagging current due to said load is increased.

4. An automatic power factor correction circuit in accordance with claim 1 and further comprising:
 means for sampling the voltage and current phase relationships at said input windings of said transformers; and
 wherein said control current from said first means is proportional to the phase difference between the voltage and the current in said input windings.

5. An automatic power factor correction circuit for providing a unity power factor to a power supply source in a system having a reactive load comprising:
 a first transformer having an input winding, an output winding, and a first control winding;
 a second transformer having an input winding, an output winding, and a first control winding;
 means coupling said first transformer input winding and said second transformer input winding in parallel across said power supply source;
 means coupling said output windings in series across said reactive load; and
 means for producing a current through said input windings which is in phase with said voltage thereacross comprising a first current supplying means coupled to said first transformer first control winding and said second transformer first control winding.

6. An automatic power factor correction circuit in accordance with claim 5 wherein said power supply source comprises a pair of transistors operated in class B, push-pull configuration coupled across said first transformer and second transformer input windings.

7. An automatic power factor correction circuit in accordance with claim 5 wherein said reactive load is capacitive, and wherein said first current supplying means comprises a rectifier bridge coupled between one side of said series connected output windings and one side of said capacitive load.

8. An automatic power factor correction circuit in accordance with claim 5 wherein said reactive load is inductive and produces a lagging current therethrough, said system further comprising:
 a first transformer second control winding and a second transformer second control winding;
 a capacitor coupled across said series connected output windings;
 a second current supplying means providing current for said second control windings of said first and second transformers wherein said second control windings saturate said first and second transformers providing a low self-inductance therein; and
 wherein said first current supplying means increases the self-inductance of said transformers when said lagging current due to said load is increased.

9. An automatic power factor correction circuit in accordance with claim 6 and further comprising:
 a phase detector having a first pair of input terminals,
 a second pair of input terminals, and an output terminal, said phase detector generating an output signal at said output terminal proportional to the phase difference between said signals at said first pair of input terminals and said second pair of input terminals; and
 means coupling said phase detector output signal to said transformer first control windings.

10. An automatic power factor correction circuit in accordance with claim 9 wherein said phase difference is the difference between said voltage and said current at said input windings.

References Cited
UNITED STATES PATENTS

| | | | |
|---|---|---|---|
| 2,421,786 | 6/1947 | Haug | 323—105 |
| 2,734,164 | 2/1956 | Knowlton | 323—56 |
| 2,920,264 | 1/1960 | Wintrode | 323—56 |
| 3,079,546 | 2/1963 | Kuba | 323—56 X |
| 3,103,619 | 9/1963 | Du Vall | 323—56 |

JOHN F. COUCH, *Primary Examiner.*

WARREN E. RAY, *Examiner.*